(12) United States Patent
Hasegawa (10) Patent No.: US 6,575,049 B1
(45) Date of Patent: Jun. 10, 2003

(54) SHIFT LEVER DEVICE

(75) Inventor: Hiroyasu Hasegawa, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 11 days.

(21) Appl. No.: 09/675,138

(22) Filed: Sep. 29, 2000

(30) Foreign Application Priority Data

Oct. 20, 1999 (JP) ............................................ 11-298094

(51) Int. Cl.[7] .......................... B60K 20/02; B60K 41/26
(52) U.S. Cl. .................................. 74/473.1; 74/473.23
(58) Field of Search .......................... 74/473.23, 483 R, 74/538, 473.1; 192/220.1, 220.2, 220.3, 220.4; 477/96

(56) References Cited

U.S. PATENT DOCUMENTS

| | | | | |
|---|---|---|---|---|
| 4,565,151 A | * | 1/1986 | Buma | .......................... 116/28.1 |
| 5,150,593 A | * | 9/1992 | Kobayashi et al. | ...... 192/219.4 |
| 5,255,570 A | * | 10/1993 | Shirahama et al. | ...... 192/219.4 |
| 5,489,246 A | * | 2/1996 | Moody et al. | ........... 192/220.2 |
| 5,493,932 A | * | 2/1996 | Plocher | .................... 192/220.3 |
| 5,494,141 A | * | 2/1996 | Osborn et al. | ........... 192/220.4 |
| 5,523,661 A | | 6/1996 | Okada et al. | |
| 5,582,073 A | | 12/1996 | Takeuchi et al. | |
| 5,887,485 A | * | 3/1999 | VanOrder et al. | ............. 29/469 |

\* cited by examiner

Primary Examiner—David A. Bucci
Assistant Examiner—Colby Hansen
(74) Attorney, Agent, or Firm—Nixon Peabody LLP; Thomas W. Cole (57) ABSTRACT

A shift lever device in which a shift lever lock mechanism is not released inadvertently, and improper operation is prevented. In the shift lever device, a lock plate, which impedes movement of a detent rod, is covered by a cavity portion of a shift lever. These internal devices are covered by a cover box and a detent plate. In a P shift position, a gap formed by, on the one hand, the cover box and the detent plate, and, on the other hand, the shift lever and the cavity portion thereof, is a labyrinthine structure which is stepped along a horizontal direction. Accordingly, improper operation can be further prevented.

22 Claims, 7 Drawing Sheets

SHIFT LEVER DEVICE

BACKGROUND OF THE INVENTION

1. Field of the Invention

The present invention relates to a shift lever device for shifting an automatic gearbox of a vehicle.

2. Description of the Related Art

A shift lever device used in an automatic gear box of a vehicle is structured such that by moving a detent pin, which is provided at a shift lever, in a lever axial direction, the detent pin disengages from a detent plate, and shifting operation is enabled.

Restraining, by a lock plate, a detent rod for moving the detent pin is known as a shift lever lock mechanism which allows the shift lever to be operated only under specific conditions such as at the time the brake is operated or the like. In such a shift lever lock mechanism, when the shift lever is in the park range (P range), the detent rod engages with the lock plate such that movement of the detent rod is prevented and shifting of the shift lever is restrained. Further, during a braking operation, a solenoid is energized such that the lock plate is moved, thereby enabling movement of the detent rod (i.e., the detent pin) such that the shift lever can be shifted.

Moreover, a shift lever lock mechanism is known in which the solenoid is electrically connected to an ignition key insertion cylinder. Only at times when the shift lever is in the park range position and the key is inserted in the cylinder and the ignition switch is at the on position is the solenoid excited such that the detent pin is movable and the shift lever can be shifted.

In such shift lever devices, the shift lever is provided so as to stand upright within the vehicle interior. An upper housing, in which an opening for movement of the shift lever is formed, is provided so as to cover the shift lever lock mechanism. A covering member known as a cover slider is provided at this opening formed in the upper housing.

SUMMARY OF THE INVENTION

An object of the present invention is to provide a shift lever device focusing on the above portions and in which improper operations of the shift lever device can be prevented further.

A first aspect of the present invention is a shift lever device for an automatic transmission, the shift lever device comprising: (a) a shift lever having a tubular main body portion, a detent rod supported within the tubular main body portion so as to be reciprocally movable along a longitudinal direction of the shift lever, and a detent pin projecting from the detent rod, the shift lever having opposite ends with one end pivotally mounted and the other end having a manipulating portion, the detent pin being positionable at first and second positions along the shift lever, and the shift lever being pivotable about the one end; (b) a detent member having a detent portion, which when the detent pin is at the first position and the shift lever is in a range which places the transmission in park, the detent portion engages with the detent pint and prevents pivoting of the shift lever from the range, and when the detent pin is at the second position, the detent portion is disengaged from the detent pin and does not prevent pivoting of the shift lever; (c) a shift lock mechanism including a lock plate, the lock plate being engageable with the detent rod, and when engaged therewith prevents movement of the detent pin from the first position to the second position; and (d) a cover forming one end of the shift lever tubular main body portion, and when the shift lever is in the range, the cover substantially covers the lock plate when the lock plate is engaged with the detent rod.

A second aspect of the present invention is a shift lever device for an automatic transmission, the shift lever device comprising: (a) a shift lever including a tubular main body portion and opposite ends, one end of the shift lever being pivotably mounted, and another end of the shift lever including a manipulation portion; (b) a shift lock mechanism having an operating portion for preventing pivoting of the shift lever and for re-enabling pivoting of the shift lever, when the shift lever is in a range which places the transmission in park; (c) a cover forming one end of the shift lever tubular main body portion, the cover adapted to substantially cover the operating portion of the shift lock mechanism when the shift lever is in the range; and (d) a cover box which has an opening through which the shift lever passes and which substantially covers the entire cover and the shift lock mechanism, and when the shift lever is in the range, there is a gap between the cover of the shift lever and the cover box.

A third aspect of the present invention is a shift lever device for an automatic transmission, the shift lever device comprising: (a) a shift lever pivotably mounted and having a cover; and (b) a shift lock mechanism preventing pivoting of the shift lever when the shift lever is in a predetermined range; and (c) wherein said cover of the shift lever covers the shift lock mechanism when the shift lever is in said range.

DESCRIPTION OF THE PREFERRED EMBODIMENTS

Figure 1:
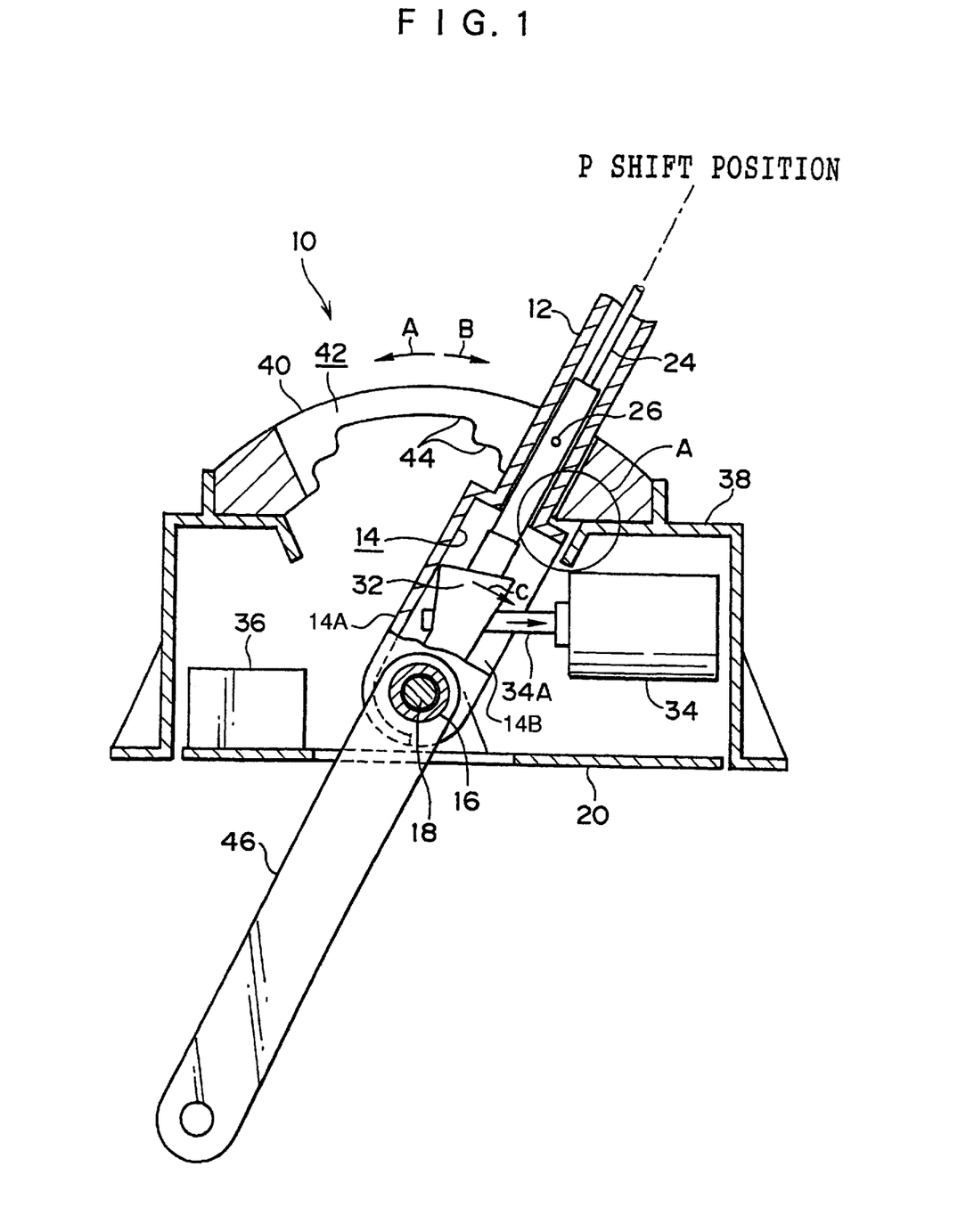
FIG. 1 is a cross-sectional view illustrating an overall structure of a shift lever device relating to an embodiment of the present invention.
Figure 2:
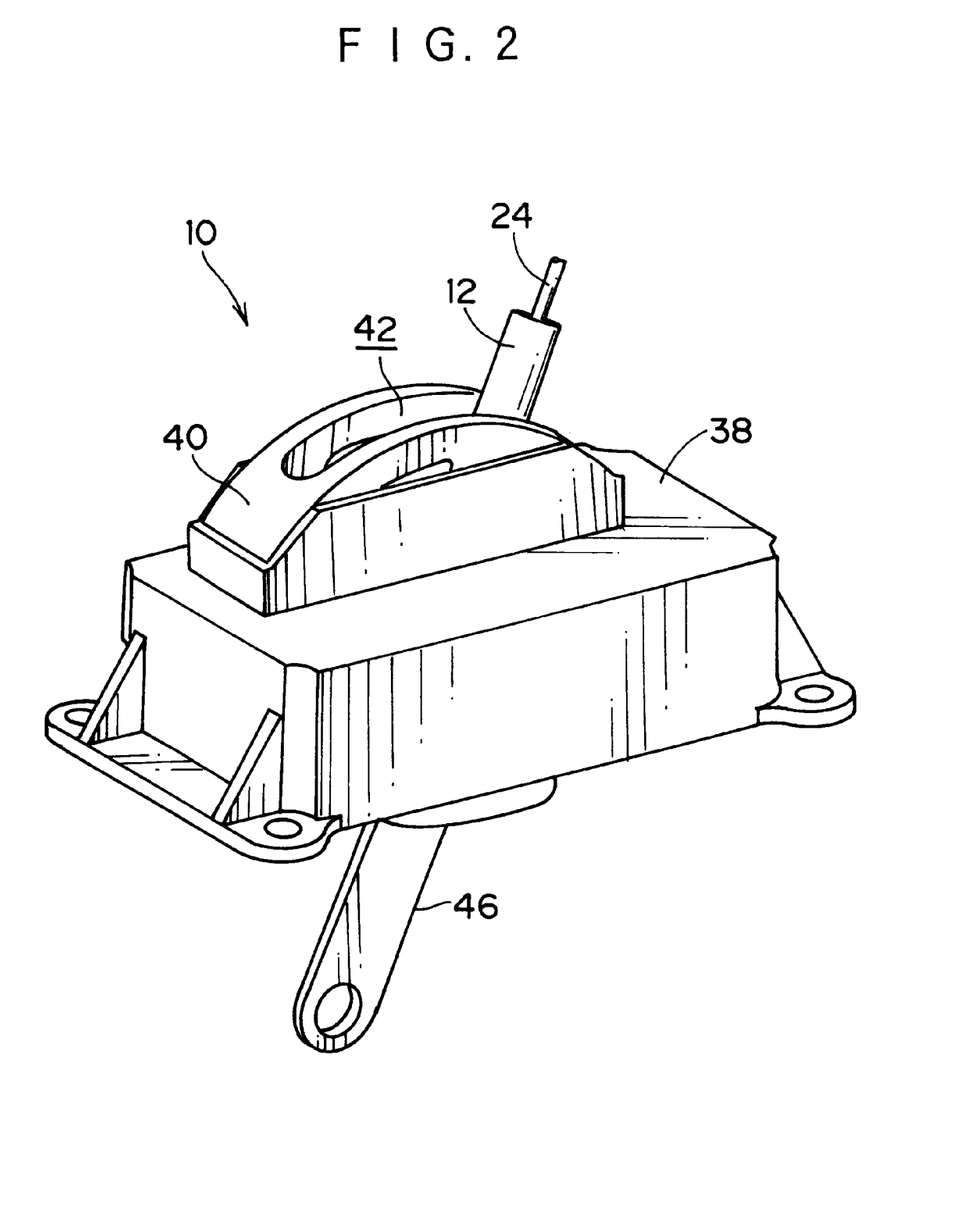
FIG. 2 is a perspective view illustrating the overall structure of the shift lever device relating to the embodiment of the present invention.
Figure 3:
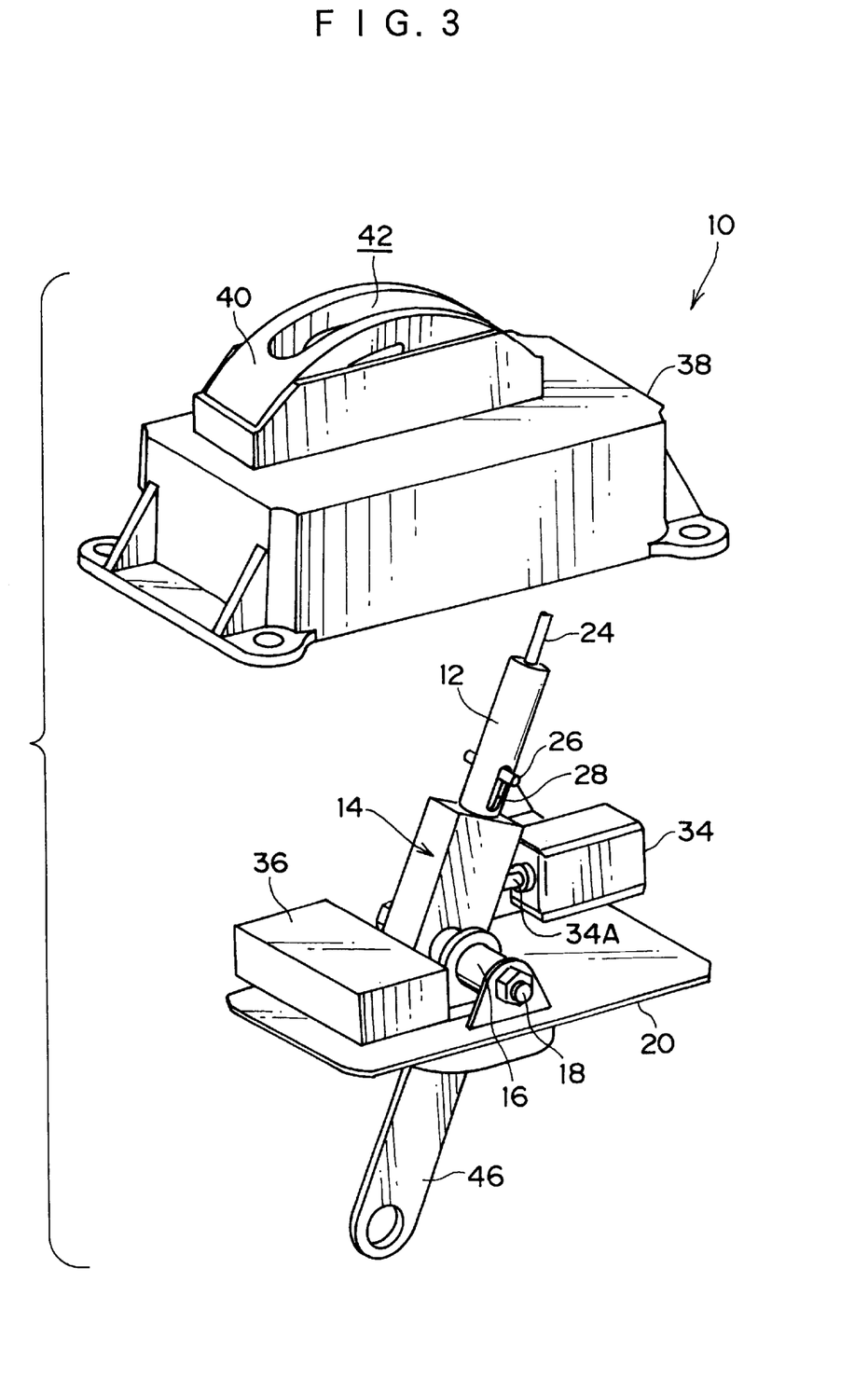
FIG. 3 is a perspective view illustrating the structure of the shift lever device relating to the embodiment of the present invention in a state in which a cover box and a detent plate are removed.
Figure 4:
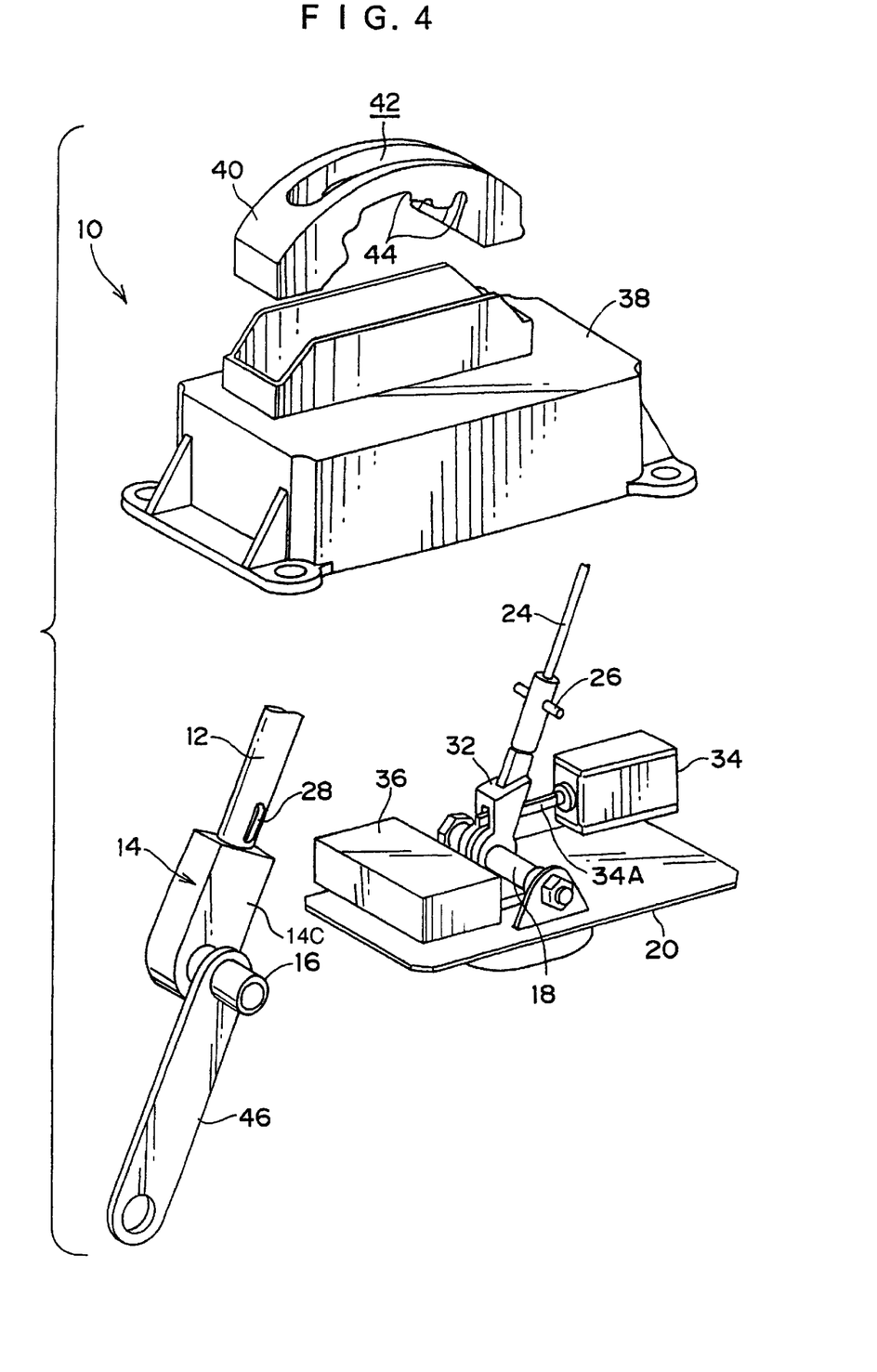
FIG. 4 is an exploded perspective view illustrating the structure of the shift lever device relating to the embodiment of the present invention in a shift-locked state.
Figure 5:
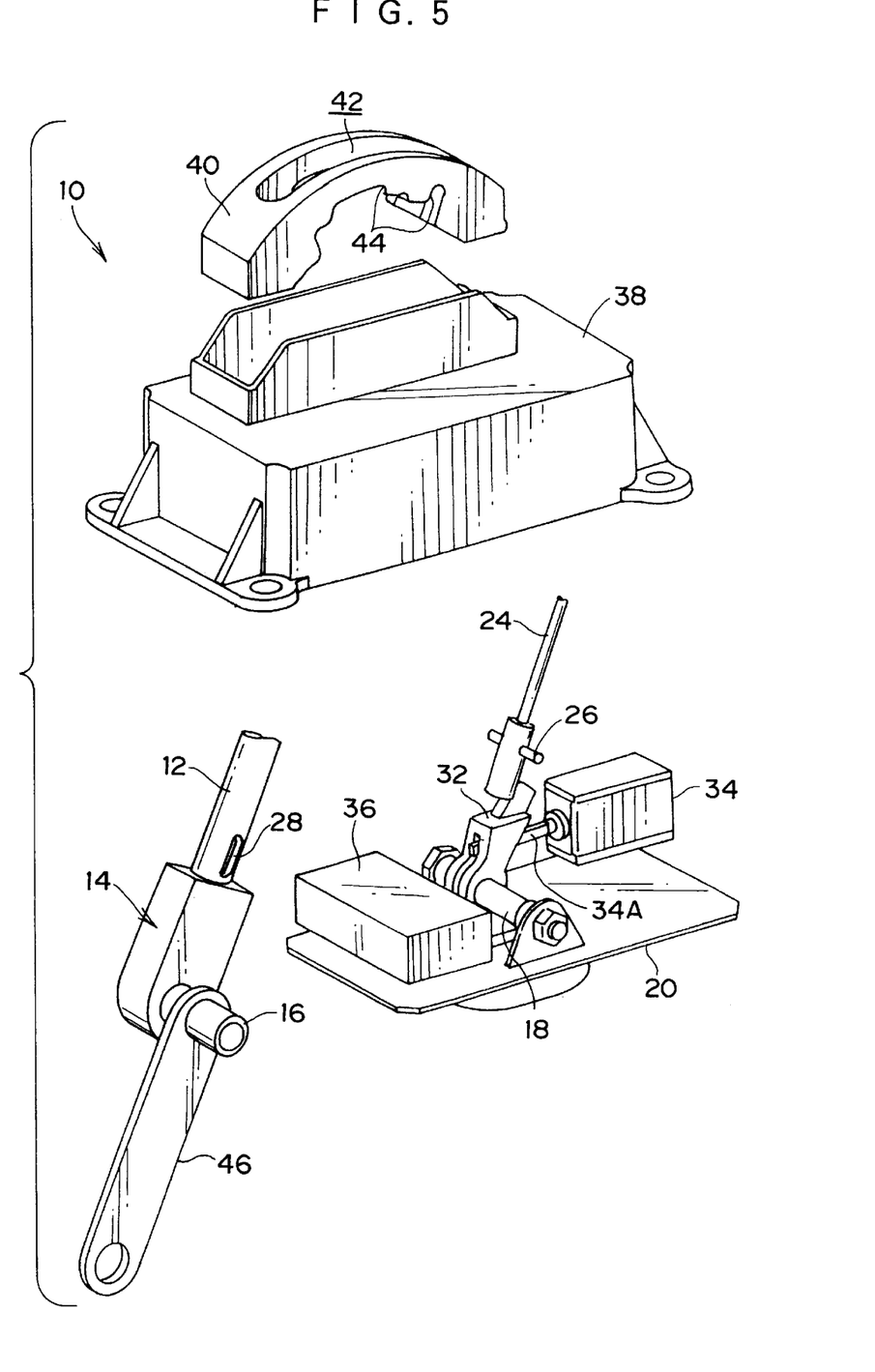
FIG. 5 is an exploded perspective view illustrating a structure of a shift lever device relating to the embodiment of the present invention in a shift-unlocked state.
Figure 6:
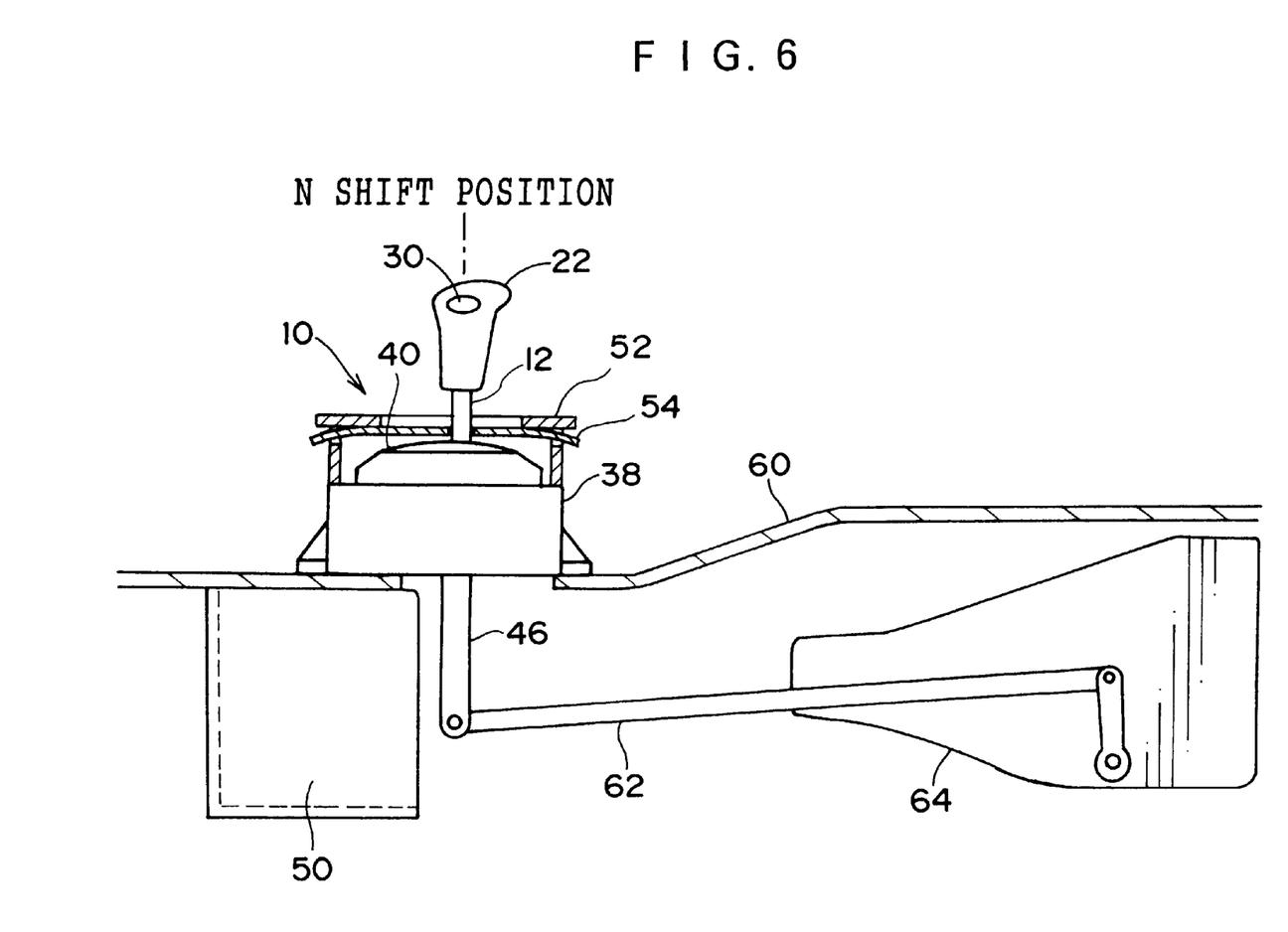
FIG. 6 is a side view illustrating a state in which the shift lever device relating to the embodiment of the present invention is disposed at a vehicle, and is at the N shift position.
Figure 7:
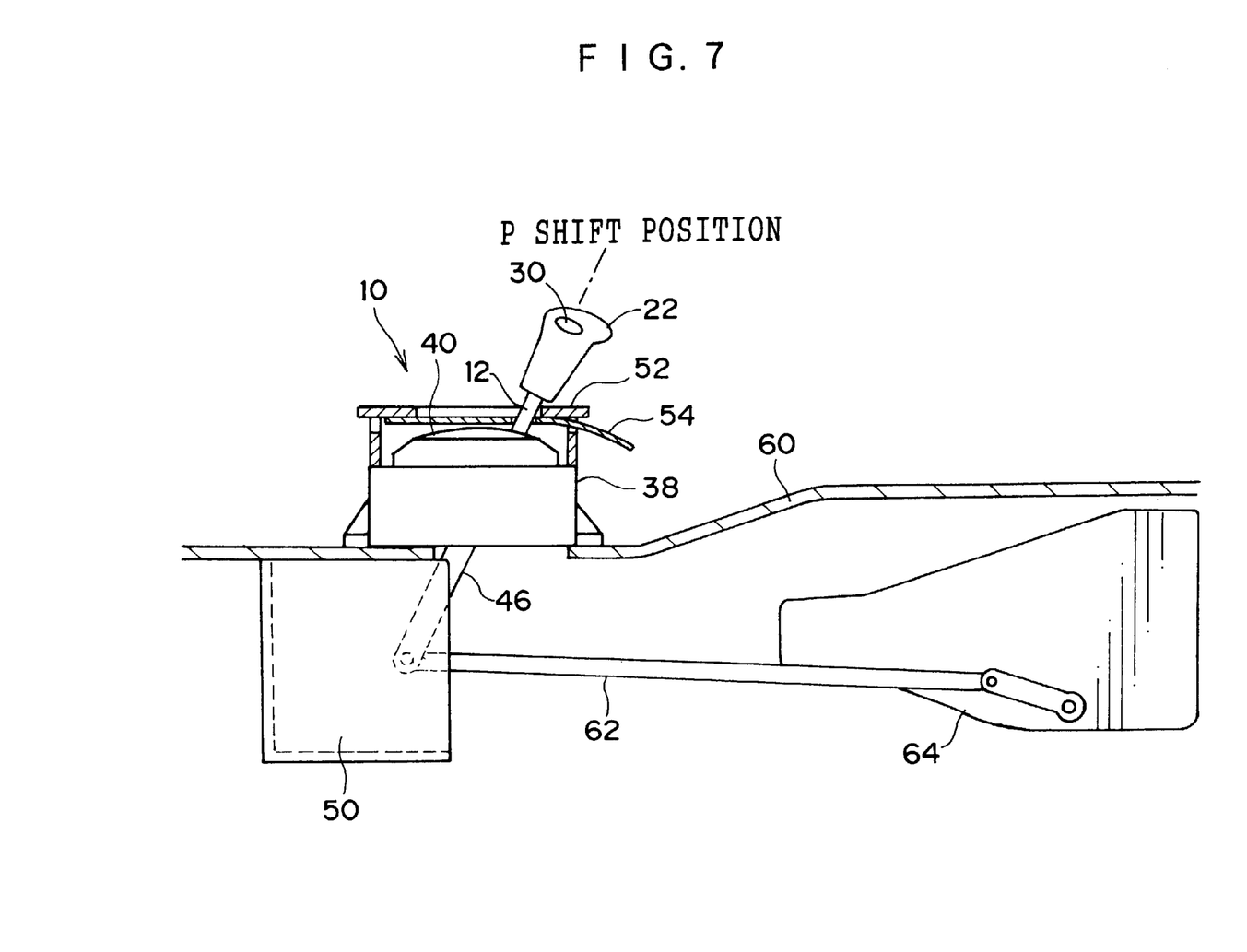
FIG. 7 is a side view illustrating a state in which the shift lever device relating to the embodiment of the present invention is disposed at a vehicle, and is at the P shift position.

The overall structure of a shift lever device 10 relating to an embodiment of the present invention is illustrated in FIG. 1 in cross-section. FIGS. 2 through 6 are perspective views illustrating the overall structure of the shift lever device 10. In FIGS. 6 and 7, the placement of the shift lever 10 is illustrated in schematic side view.

The shift lever device 10 is provided with a shift lever 12 which is tubular. A cavity portion 14 is provided integrally at the lower end portion of the shift lever 12. The cavity 14 portion has three sides 14A, 14B, 14C which enclose the lock plate 32 while leaving one side open. Two of the sides 14B, 14C are positioned parallel to the plane of movement of the shift lever 12 about shaft 18; while the side 14A is transverse to the plane of movement of the shift lever. A tubular retainer 16 is fixed to the cavity portion 14. The shift lever 12 is pivotally supported to a base plate 20 by a supporting shaft 18 via the tubular retainer 16. The shift lever 12 can be shifted in the directions of arrows A and B in FIG. 1 around the tubular retainer 16 (the supporting shaft 18) by operation of a shift knob 22 mounted to an upper end portion of the shift lever 12.

A detent rod 24 and a detent pin 26 are disposed within the shift lever 12. The detent rod 24 can move up and down along the axis of the shift lever 12. The detent pin 26 projects out toward the side from an elongated hole 28 formed in the shift lever 12, and is guided by the elongated hole 28 so as to be movable up and down along the axial direction of the shift lever 12. Further, the detent rod 24 and the detent pin 26 are urged upward by an urging means (not illustrated) disposed inside the shift lever 12. The detent rod 24 is connected to a detent release button 30 provided at the shift knob 22. By pressing the detent release button 30, the detent rod 24 is moved downward (in the direction of approaching the tubular retainer 16) against the urging force of the urging means (not shown).

A lock plate 32 is disposed directly beneath the detent rod 24, i.e., within the cavity portion 14 of the shift lever 12. The lock plate 32 is mounted integrally with the supporting shaft 18 which supports the shift lever 12 (tubular retainer 16), and can be inserted onto and removed from the locus of movement of the lower end portion of the detent rod 24. In other words, as illustrated in FIG. 4, in a state in which the the lock plate 32 is disposed on the locus of movement of the lower end portion of the detent rod 24, the detent rod 24 cannot be lowered.

Further, a solenoid 34 is disposed at a side (next to the lock plate 32) of the cavity portion 14 of the shift lever 12. A plunger 34A of the solenoid 34 is connected to the lock plate 32. When the solenoid 34 is energized, the plunger 34A is sucked in, whereas when the solenoid 34 is not energized, the plunger 34A is pulled out by the urging force of a return spring housed within the plunger 34A. When the solenoid 34 is excited, by pulling the plunger 34A in against the urging force of the return spring, the lock plate 32 is swung around the supporting shaft 18, and is removed from the locus of movement of the lower end portion of the detent rod 24. Accordingly, in this state, as illustrated in FIG. 5, it is possible to lower the detent rod 24.

The solenoid 34 is connected to a control device 36, and is operated on the basis of conditions which will be described in detail later.

The cavity portion 14 of the shift lever 12 structured as described above, the solenoid 34, the control device 36, and the like are covered by a cover box 38 which serves as a cover member. Further, a detent plate 40, which similarly forms a cover member, is mounted to the top portion of the cover box 38. The shift lever 12 passes through an opening 42 for movement formed in the detent plate 40, and projects upward.

Detent holes 44 are formed in a vicinity of the opening 42 for movement formed in the detent plate 40. The detent pin 26, which projects from the elongated hole 28 of the shift lever 12, passes through the detent holes 44.

The detent holes 44 are provided in correspondence with the respective shift positions of "P", "R", "N", "D", "2", and "L", and the upper inner peripheral walls thereof are bent in convex and concave shapes. In this way, the movement of the detent pin 26 in the direction of arrow A and in the direction of arrow B is limited.

Namely, the shift operation positions are provided such that, if the detent pin 26 has not yet been moved downward by operation of the detent releasing button 30, the shift lever 12 cannot be swung in the direction of arrow A or in the direction of arrow B. For example at the "P" shift position, the detent pin 26 is located within the deep groove of the detent holes 44. If the above operation is not carried out, shifting to the "R" shift position cannot be carried out. Further, as described above, in the state in which the lock plate 32 is disposed on the locus of movement of the lower end portion of the detent rod 24, the detent rod 24 cannot be lowered. Thus, the detent pin 26 cannot be pulled out from the deep groove at the "P" range of the detent hole 44, and the shift operation of the shift lever 12 is prevented. Namely, the shift lever 12 is in a shift-locked state.

The solenoid 34 for moving the lock plate 32 is energized and excited by electrical control of the control device 36 only when the brake pedal is depressed while the shift position "P" of the shift lever 12 has been selected and the ignition switch (not shown) is on. Namely, the solenoid 34 is not energized and excited when the ignition switch is on but the shift lever 12 is in a shift position other than "P".

Here, in a specific shift position (the "P" shift position), the gap formed by, on the one hand, the cover box 38 and the detent plate 40, and, on the other hand, the shift lever 12 and the cavity portion 14 thereof, is a labyrinthine structure which is stepped along the horizontal direction (see portion A in FIG. 1).

As illustrated in FIG. 6 and FIG. 7, the main portion of the shift lever device 10 structured as described above is disposed directly beneath an upper housing 52 and a cover slider 54 forming a design surface at the interior of the vehicle. Further, an arm 46 is fixed to the tubular retainer 16 to which the shift lever 12 (the cavity portion 14) is fixed. The arm 46 is disposed so as to project downwardly from a floor panel 60 of the vehicle. An automatic gearbox 64 of the vehicle is connected to the arm 46 via a rod 62 connected to the arm 46.

As shown in FIGS. 6 and 7, a separating wall 50 is provided at the reverse surface side of the floor panel 60 which is directly beneath the shift lever device 10. The separating wall 50 corresponds to a connecting portion of the rod 62 and the arm 46 of the shift lever device 10. When the shift lever 12 is set in a specific shift position (the "P" shift position) as described above, the connecting portion of the arm 46 and the rod 62 is covered so as to be hidden from (not exposed to) the exterior thereof.

Next, operation of the present embodiment will be described.

When the ignition switch is in the "ACC" or "LOCK" position, the solenoid 34 is not energized. Thus, the plunger 34A is pulled out, and the lock plate 32 is set on the locus of movement of the lower end portion of the detent rod 24. As a result, as illustrated in FIGS. 1 and 4, the detent rod 24 is prevented from moving downward along the axis of the shift lever 12. Accordingly, while the detent pin 26 is in the deep groove of the detent hole 44, movement of the detent pin 26 is prevented. Thus, shifting of the shift lever 12 is prevented.

When the shift lever 12 is to be shifted, the ignition switch is turned on and the brake pedal is depressed. In this way, the solenoid 34 is energized and excited by electrical control, the plunger 34A is sucked in against the urging force of the return spring, and the lock plate 32 is swung in the direction of arrow C in FIG. 1 around the supporting shaft 18. As a result, the lock plate 32 moves out from the locus of movement of the lower end portion of the detent rod 24. The detent rod 24 can thereby be moved downward. As shown in FIG. 5, the detent release button 30 is pressed and the detent pin 26 is moved downward such that the shift lever 12 can be moved to the desired shift position.

Here, in the shift lever device 10, the cavity portion 14 of the shift lever 12, the lock plate 32, the solenoid 34 and the control device 36 are covered by the cover box 38 and the detent plate 40.

The lock plate 32, the engaged portion of the lock plate 32 and the detent rod 24, and the connected portion of the lock plate 32 and the solenoid 34 are covered by the cavity portion 14 of the shift lever 12. Further, in a specific shift position (the "P" shift position), the gap formed by, on the one and, the shift lever 12 and the cavity portion 14 thereof, and on the other hand, the cover box 38 and the detent plate 40 is formed in a labyrinthine shape which is stepped along the horizontal direction (refer to portion A in FIG. 1).

Accordingly, in the specific shift position (the "P" shift position), this portion is covered by the cavity portion 14 of the shift lever 12 and the gap is formed in a labyrinthine shape. Thus, improper operations can be prevented.

In the predetermined shift position (the "P" shift position), the connecting portion of the rod 62 and the arm 46 of the shift lever device 10 is covered and hidden from (not exposed to) the exterior by the separating wall 50 which is provided at the reverse surface side of the floor panel 60 directly beneath the shift lever device 10. Therefore, it is possible to even further prevent improper operations.

In this way, in the shift lever device 10 relating to the present embodiment, the shift lever lock mechanism is not released inadvertently, and improper operations can be prevented.

What is claimed is:

1. A shift lever device for an automatic transmission, the shift lever device comprising:

(a) a shift lever having a tubular main body portion, a detent rod supported within the tubular main body portion so as to be reciprocally movable along a longitudinal direction of the shift lever, and a detent pin projecting from the detent rod, the shift lever having opposite ends with one end pivotally mounted and the other end having a manipulating portion, the detent pin being positionable at first and second longitudinal positions along the shift lever, and the shift lever being pivotable about a plane at said one end;

(b) a detent member having a detent portion, which when the detent pin is at the first longitudinal position and the shift lever is in a predetermined position, the detent portion engages with the detent pin and prevents pivoting of the shift lever from said predetermined position, and when the detent pin is at the second longitudinal position, the detent portion is disengaged from the detent pin and does not prevent pivoting of the shift lever;

(c) a shift lock mechanism including a lock plate, the lock plate being engagable with the detent rod, and when engaged therewith prevents movement of the detent pin from the first longitudinal position to the second longitudinal position;

(d) a cover forming one end of the shift lever tubular main body portion, and when the shift lever is in said predetermined position, wherein, when the lock plate is engaged with the detent rod, said cover encloses the lock plate on three sides leaving one side open and said cover includes a wall transverse to said plane of movement of said shift lever, and (e) a cover box having an opening through which the shift lever passes, and which substantially covers the entire cover and the shift lock mechanism, wherein when the shift lever is in said predetermined position, there is a gap between the cover of the shift lever and the cover box.

2. The shift lever device of claim 1, wherein the shift lock mechanism includes a driving device which moves the lock plate between an engaged position, wherein the lock plate is engaged with the detent rod, and a non-engaged position where the lock plate is not engaged with the detent rod.

3. The shift lever device of claim 2, wherein the driving device includes a solenoid.

4. The shift lever device of claim 3, wherein the solenoid includes a plunger having a free end connected to the lock plate.

5. The shift lever device of claim 4, wherein the cover has an opening through which the plunger passes.

6. The shift lever device of claim 1, wherein the lock plate and shift lever are pivotable about a common axis.

7. The shift lever device of claim 6, wherein the shift lock mechanism includes a driving device which moves the lock plate between an engaged position, wherein the lock plate is engaged with the detent rod, and a non-engaged position where the lock plate is not engaged with the detent rod.

8. The shift lever device of claim 7, wherein the driving device includes a solenoid.

9. The shift lever device of claim 8, wherein the solenoid includes a plunger having a free end connected to the lock plate.

10. The shift lever device of claim 9, wherein the cover has an opening through which the plunger passes.

11. The shift lever device of claim 1, further comprising a cover box having an opening through which the shift lever passes, and which substantially covers the entire cover and the shift lock mechanism, wherein when the shift lever is in said range, there is a gap between the cover of the shift lever and the cover box.

12. The shift lever device of claim 1, wherein the automatic transmission is in a vehicle having a floor panel, the shift lever device further comprising:

an arm integrally connected to one end of the shift lever, the arm having an end which passes through the vehicle floor panel and projects therefrom when the shift lever device is used in the vehicle;

a shift rod connecting to the end of the arm; and a connecting portion cover adapted to cover an area of connection between the arm and the shift rod.

13. The shift lever device for an automatic transmission according to claim 1, wherein said cover further includes a pair of opposing walls, parallel to said plane of movement of said shift lever, connected to said transverse wall such that said shift lock mechanism is enclosed on three sides.

14. The shift lever device for an automatic transmission according to claim 1, wherein said cover and said shift lever tubular main body portion are one piece.

15. A shift lever device for an automatic transmission, the shift lever device comprising:

(a) a shift lever including a tubular main body portion and opposite ends, one end of the shift lever being pivotably mounted and the another end of the shift lever including a manipulation portion;

(b) a shift lock mechanism having a operating portion for preventing pivoting of the shift lever and for re-enabling pivoting the shift lever, when the shift lever is in a predetermined position;

(c) a cover forming one end of the shift lever tubular main body portion, the cover adapted to enclose the operating portion of the shift lock mechanism on three sides leaving one side open when the shift lever is in said predetermined position and includes a wall transverse to a plane of movement of said shift lever; and (d) a cover box which has an opening through which the shift lever passes and which substantially covers the entire cover and the shift lock mechanism, and when the shift lever is in said predetermined position, there is a gap between the cover of the shift lever and the cover box.

16. The shift lever device of claim 15, further comprising a detent member mounted to the cover box, the detent member having an opening through which the shift lever passes.

17. The shift lever device of claim 16, wherein the opening of the detent member has a cross-sectional area less than that of the opening of the cover box.

18. A shift lever device for an automatic transmission, the shift lever device comprising:

(a) a shift lever pivotably mounted and movable along a plane, said lever having a cover; and (b) a shift lock mechanism preventing pivoting of the shift lever when the shift lever is in a predetermined position;

(c) wherein said cover of the shift lever encloses the shift lock mechanism on three sides leaving one side open when the shift lever is in said predetermined position, and said cover includes a wall transverse to said plane of movement of said shift lever, and (d) a cover box having an opening through which the shift lever passes, and which substantially covers the entire cover and the shift lock mechanism, wherein when the shift lever is in said predetermined position, there is a gap between the cover of the shift lever and the cover box.

19. The shift lever device for an automatic transmission according to claim 18, wherein said cover further includes a pair of opposing walls, parallel to said plane of movement of said shift lever, connected to said transverse wall such that said shift lock mechanism is enclosed on three sides.

20. The shift lever device for an automatic transmission according to claim 18, wherein said cover and said shift lever are one piece.

21. A shift lever device for an automatic transmission, the shift lever device comprising:

(a) a shift lever having a tubular main body portion, a detent rod supported within the tubular main body portion so as to be reciprocally movable along a longitudinal direction of the shift lever, and a detent pin projecting from the detent rod, the shift lever having opposite ends with one end pivotally mounted and the other end having a manipulating portion, the detent pin being positionable at first and second longitudinal positions along the shift lever, and the shift lever being pivotable about said one end;

(b) a detent member having a detent portion, which when the detent pin is at the first longitudinal position and the shift lever is in a predetermined position, the detent portion engages with the detent pin and prevents pivoting of the shift lever from said predetermined position, and when the detent pin is at the second longitudinal position, the detent portion is disengaged from the detent pin and does not prevent pivoting of the shift lever;

(c) a shift lock mechanism including a lock plate, the lock plate being engagable with the detent rod, and when engaged therewith prevents movement of the detent pin from the first longitudinal position to the second longitudinal position;

(d) a cover forming one end of the shift lever tubular main body portion, and when the shift lever is in said predetermined position, the cover encloses the lock plate on three sides leaving one side open when the lock plate is engaged with the detent rod; and (e) a cover box having an opening through which the shift lever passes, and which substantially covers the entire cover and the shift lock mechanism, wherein when the shift lever is in said predetermined position, there is a gap between the cover of the shift lever and the cover box.

22. A shift lever device for an automatic transmission, the shift lever device comprising:

(a) a shift lever pivotably mounted and having a cover;

(b) a shift lock mechanism preventing pivoting of the shift lever when the shift lever is in a predetermined position;

(c) a cover box having an opening through which the shift lever passes, and which substantially covers the entire cover and the shift lock mechanism; and (d) a detent member mounted to the cover box, the detent member having an opening through which the shift lever passes, (e) wherein said cover of the shift lever encloses the shift lock mechanism on three sides leaving one side open when the shift lever is in said predetermined position.

* * * * *